United States Patent [19]
Beach

[11] 3,791,273
[45] Feb. 12, 1974

[54] INDICATOR LIGHT FOR CAMERA HAVING ELECTRONIC SHUTTER

[75] Inventor: David Easton Beach, Penfield, N.Y.

[73] Assignee: Eastman Kodak Company, Rochester, N.Y.

[22] Filed: Oct. 10, 1972

[21] Appl. No.: 296,390

[52] U.S. Cl. ............... 95/11 V, 95/10 C, 88/1.5 R
[51] Int. Cl. .......................................... G03b 17/20
[58] Field of Search ...... 95/11 V, 53 E, 10 C, 11 R; 88/1.5 R, 1.5 NR

[56] References Cited
UNITED STATES PATENTS

| | | | |
|---|---|---|---|
| 3,416,422 | 12/1968 | Dietrich et al. | 95/11 R |
| 3,668,985 | 6/1972 | Wazumi | 95/11 V X |
| 2,952,195 | 9/1960 | Babcock et al. | 95/11 R |
| 3,645,181 | 2/1972 | Reiche et al. | 95/10 C X |
| 3,393,620 | 7/1968 | Reiche et al. | 95/11 R |

Primary Examiner—Robert P. Greiner

[57] ABSTRACT

An indicator for use in a camera of the type having a light responsive electronic circuit which controls the open time of a shutter in relation to scene light intensity, and determines the existence of preselected camera states and/or scene light intensity conditions. The indicator includes a lens element having a portion which is external of the viewfinder, and a lamp connected to the electronic circuit. The indicator includes a light conducting element disposed relative to the lamp and to the lens element so that light from the lamp is transmitted to a location to be observed through a viewfinder of the camera, and to the lens element which transmits the light to the external portion, so that the light transmitted from the lamp to the external portion may be observed at a position removed from the camera viewfinder.

6 Claims, 5 Drawing Figures

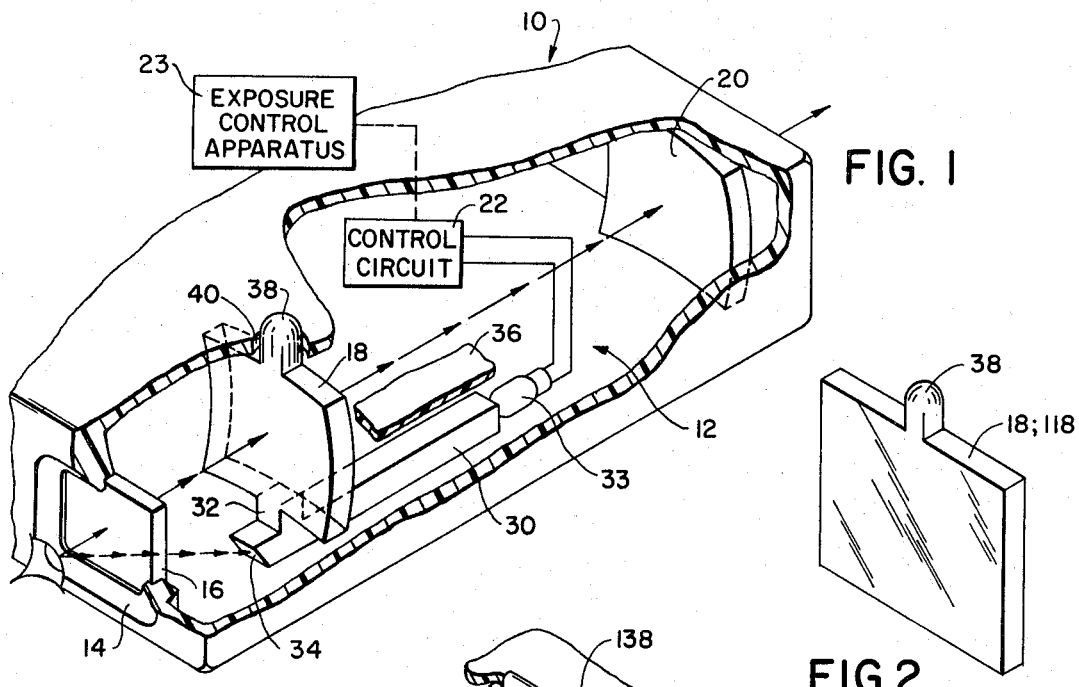
FIG. 1
FIG. 2
FIG. 3
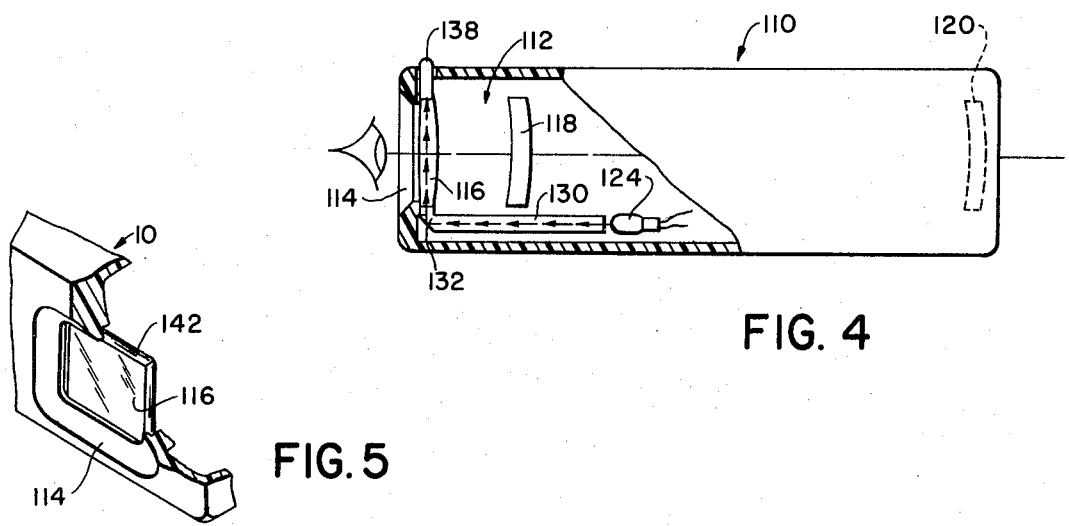
FIG. 4
FIG. 5

3,791,273

INDICATOR LIGHT FOR CAMERA HAVING ELECTRONIC SHUTTER

BACKGROUND OF THE INVENTION

1. Field of the Invention

This invention relates to indicators, for use with electrically controlled cameras, for indicating the existence of a preselected light intensity, and/or the state of critical camera functions.

2. Description of the Prior Art

Cameras may be provided with electronically controlled exposure apparatus for providing shutter speeds appropriate for both low, average or high scene light conditions. During high scene light conditions the exposure control apparatus provides for short exposure intervals, during which intervals the camera, if hand held, is not affected by operator motion which is transmitted to the camera. However, during low scene light conditions, an exposure interval may be provided which requires the operator to hold the camera steady for a longer period than is normally expected. Cameras which have the capability of furnishing a long exposure interval i.e., for example in the order of 10 seconds, are often provided with a means for indicating to the operator, that the shutter is open, and indicating when the shutter has closed. These cameras have included a light which is turned on during the period that the shutter is open and is turned off as the shutter closes or vice versa. Some cameras rely on an audible sound made by the closing shutter mechanism. These indicator means are useful as an indicator of the shutter open condition, however, they have not also previously been multiply utilized to indicate that a high or a low light condition exists or that the camera has a certain existing condition such as a defective flashcube inserted. There has generally been one indicator for the shutter open condition and separate indicators of various forms for the other conditions, which requires additional camera space.

SUMMARY OF THE INVENTION

It is therefore an object of the present invention to provide an improved indicator, for use with electrically controlled cameras, which provides a signal indicative of multiple preselected camera conditions prior to or during exposure.

It is a further object to provide multiple usage of camera elements so as to provide simplified signals which relate to exposure time and exposure conditions.

These and other objects are accomplished according to one illustrative embodiment of the invention by an indicator for use in a camera of the type having a viewfinder and at least one lens element having a portion visible external of the viewfinder. The indicator includes a light source disposed in relation to the lens element such that light from the light source is visible through the viewfinder and in the portion external of the viewfinder from a position remote of the viewfinder.

In a preferred embodiment of the apparatus the camera includes circuit means for determining the existence of predetermined scene light intensity conditions. The viewfinder includes at least one lens element which has a portion visible external of the viewfinder from a position removed from the viewfinder. An indicator light is connected to the circuit and becomes energized during the existence of the predetermined camera conditions or scene light intensity conditions. Light conducting means are disposed relative to the indicator light and lens element for transmitting light for observation through the viewfinder; for transmitting a portion of the light to the lens element, which transmits the light to the external portion for view a distance removed from the viewfinder.

In one embodiment of the invention, the light transmitting means is disposed at one edge of the lens element and transmits light to the lens element at an angle to the viewfinder axis.

BRIEF DESCRIPTION OF THE DRAWINGS

The invention, and its objects and advantages will become more apparent in the detailed description of the preferred embodiments presented below in conjunction with the accompanying drawings in which:

FIG. 1 is a perspective, cut-away view of a camera including a viewfinder, and showing an indicator according to one embodiment of the present invention;

FIGS. 2 and 3 are detailed views of lens elements which may be used with the embodiment shown in FIG. 1; and FIGS. 4 and 5 are alternate embodiments of the invention of FIG. 1.

DETAILED DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Referring first to FIG. 1 there is shown a portion of the camera body 10 having a cut-away section disclosing a viewfinder assembly 12. The viewfinder 12 may be of conventional form and may utilize two, three or more lens elements. The viewfinder 12, or one embodiment shown in FIG. 1, icludes an aperture 14, a first lens element 16, a second lens element 18 and a third lens element 20. The viewfinder 12 operates in the usual manner for providing an upright image of an object scene, in the eye of an operator, as viewed through the aperture 14.

The camera includes a control circuit 22 which provides for electronic control of exposure control apparatus 23, in accordance with scene light intensity. The electronic control circuit 22 and exposure control apparatus 23 may be such as that disclosed in commonly assigned, copending application Ser. No. 179,709 filed Sept. 13, 1971 in the name of Lawrence M. Wood. The control circuit 22 includes a lamp 24 which may become energized during a variety of conditions such as when a low scene light intensity condition exists i.e., a condition of light normally requiring artificial illumination, such as by use of flash unit. The lamp 24 may also become energized during a condition when the exposure control apparatus 23 (shutter) is in an open state, such as for example during a long exposure that may be effected by the electronic circuit 22, without the use of artificial illumination during low scene light. By appropriate switching, as described in the above-referenced application, the lamp 24 may also be used to indicate a defective flash unit.

When utilizing a light, such as the lamp 24, in cameras such as that shown by the camera body 10, which may be a thin, flat, rectangular camera, only a small area is available in the camera in which the elements may be placed. This space is particularly limited when the indicator is to be observable while looking directly into the viewfinder aperture 14, and alternatively observable at some position external of the camera. The phrase "external of the camera" when used herein with reference to viewing refers to viewing from a distance removed from the camera such that the operator is not viewing a scene through the viewfinder 12; for example, when the operator uses a cable release with the camera.

In accordance with the teachings of the present invention, the lamp 24 is disposed relative to one end of an elongated, light transmitting member 30. The light transmitting member 30 may be a hollow member or solid member such as a fiber optic member which is capable of transmitting light from one end to the other. The light transmitting member 30 may be flat at the one end 33 adjacent lamp 24 and beveled at the other end 34, and may include a projecting portion 32 disposed contiguous to the bottom of the lens element 18. Light from the lamp 24 is transmitted through the light transmitting member 30, through the projecting portion 32, to the lens element 18. Of course, one skilled in the art may devise any number of shapes for the light transmitting member 30 which are suitable for use with the present invention, and may place the light transmitting member 30 in various places relative to the lens element 18. The shape and position as shown in FIG. 1 are therefore only representative of many shapes and positions available. A shield portion 36 may be placed over the light transmitting member 30 and lamp 24 to prevent stray light from being visible in the viewfinder 12.

The lens element 18 may be of glass or plastic or other suitable material and may have a polished surface which will transmit light from one edge surface to the opposing surface, however, will not lose an appreciable amount of light in the adjacent surfaces. Lens elements which may be appropriate for use with the present invention are more clearly shown in FIGS. 2 and 3. The lens element 18 of FIG. 2, which is shown in the embodiment of FIG. 1, includes a dome portion 38 received in an opening 40 in the camera body 10. The dome portion 38 of FIG. 2 may also take the form of that shown in FIG. 3, this shape is not critical to the invention, and an extended portion 39 of FIG. 3 may replace the beveled end 34.

A second embodiment of the invention is shown in FIG. 4, wherein a cut-away view of a camera body 110 discloses a viewfinder 112. The viewfinder 112 includes an aperture 114, a first lens element 116, a second lens element 118, and a third lens element 120. In this alternative embodiment of the invention, the lens element 116 is disposed immediately adjacent to the aperture 114, and is used as an eyepiece for viewing an object scene through the view finder 112. A light transmitting member 130 is disposed along the viewfinder 112, similarly to that of FIG. 1, and includes an extension 132 placed contiguous to the lens element 116. A lamp 124 is disposed adjacent to one end of the light transmitting member 130, for providing light to be transmitted along the light transmitting member 130, through extension 132, and through the lens element 116 to a dome portion 138 of the lens element 116. In the embodiment shown in FIG. 4 it is evident that one may provide an indicator which may be viewed external of the camera by means of the dome portion 138, or the dome portion 138 may be replaced by indicator element 142 of a third embodiment shown in FIG. 5. In the embodiment of FIG. 5, the indicator element 142 is peripherally placed on the lens element 116. The lens element 116 of FIG. 5 replaces the lens element 116 of FIG. 4, and the indicator element 142 replaces the dome portion 138 of FIG. 4. In the embodiment of FIG. 5, light from the lamp 124 will be transmitted along the light transmitting member 130, through the extension 132, to the lens element 116, and thus transmitted transversely of lens element 116, to illuminate the indicator element 142. The indicator element 142, when illuminated, may be observed by the eye of an operator through the viewfinder 112, from a position looking through the aperture 114, and from a position displaced a distance from the aperture 114 in any direction.

The apparatus of FIG. 1 may be used by an operator in the following manner. A control member (not shown) is depressed to energize the control circuit 22 as the operator looks through the viewfinder 12, or the control member may be depressed as the operator observes the dome portion 38 from a position external to the aperture 14. If a low light intensity condition exists, (or other conditions as the lamp 24 may be designated to indicate) the lamp 24 becomes energized and light will be transmitted along the light transmitting member 30, through the viewfinder 12, and through the lens element 18, to the dome portion 38. The operator will see the light as the dome portion 38 is illuminated, or will see the light by looking at the beveled end 34 through the viewfinder aperture 14. The end 34 is beveled away from the eye of the operator to subdue the light as seen through the aperture 14. If scene light conditions are such that a low scene light condition exists, however, the operator does not choose to use artificial illumination, the operator will know that the exposure time as controlled by the electronic circuit 22 will be too long for hand-held cameras. Therefore, the operator must rest the camera on an appropriate stable object, such as a tripod, before the shutter release mechanism (not shown) is actuated. After the camera is properly rested, and an object in a scene has been properly placed within the field of view of the camera, the release mechanism may be depressed and the operator may withdraw the eye from the viewfinder 12 and observe only the dome show light from the lamp 24 during the period of time that the shutter is open, but will not show the light from lamp 24 after the shutter closes (the lamp being turned off by operation inherent in the electronic circuit).

The apparatus as shown in FIGS. 1 and 4 may be utilized in the manner as just described when the dome portions 38, or 138 are utilized. However, in the event that the operator does not remove the eye from the viewfinder to observe the indication as to when the shutter closes, the indication is still present because the light is also visible through the viewfinder via the light transmitting members 30, 130.

The invention has been described in detail with particular reference to a preferred embodiment thereof, but it will be understood that variations and modifications can be effected within the spirit and scope of the invention.

I claim:

1. In a camera having a viewfinder including lens means through which an object scene may be viewed, shutter means, and circuit means for ensing the existence of a preselected state or operability of camera functions, the improvement comprising:
   a light source, connected to said circuit means and being energizable thereby, for providing light during the preselected state or operability of a camera function;
   light receptive indicator means, contiguous to said lens means and being located to be visible external of said viewfinder, for receiving light; and
   light conducting means, disposed contiguous to said lens means and adjacent said light source, for conducting light from said lamp to a location observable through the viewfinder, and to said lens means so that said light becomes observable in said light receptive indicator means.

2. Apparatus as recited in claim 1 wherein said light source is disposed adjacent one end of said light conducting means.

3. Apparatus as recited in claim 2 wherein said lens means is disposed between said light receptive indicator and said light conducting means.

4. Apparatus as recited in claim 3 wherein said light receptive indicator means is formed as part of said lens means.

5. Apparatus as recited in claim 4 wherein said light receptive indicator means, said light conducting means and said lens means comprise a one-piece unit.

6. In a camera having shutter means, and light responsive circuit means for establishing an exposure interval of length related to scene light intensity, said circuit including means for determining the existence of preselected scene conditions and the state or operability of camera functions, the improvement comprising:
   camera viewfinder means including at least one lens element, said lens element having a peripheral portion located external of said viewfinder;
   a light source connected to said circuit and being energizable thereby to indicate the existence of the preselected scene light intensity condition or the state or operability of said camera functions; and
   light conducting means, disposed relative to said light source and said lens element, for transmitting light from said light source to a location observable through said viewfinder, and to a location for said lens element to transmit the light to said peripheral portion.

* * * * *